Nov. 21, 1967  D. W. PIGEON ETAL  3,353,868
ADJUSTABLE SEAT BACK MECHANISM
Filed Oct. 13, 1965  2 Sheets-Sheet 1

INVENTORS
Dale W. Pigeon, &
Joseph D. Upchurch

Robert L. Spencer
ATTORNEY

Nov. 21, 1967 D. W. PIGEON ETAL 3,353,868
ADJUSTABLE SEAT BACK MECHANISM
Filed Oct. 13, 1965 2 Sheets-Sheet 2

INVENTORS
Dale W. Pigeon, &
Joseph D. Upchurch

Robert L. Spencer
ATTORNEY

United States Patent Office 3,353,868
Patented Nov. 21, 1967

3,353,868
ADJUSTABLE SEAT BACK MECHANISM
Dale W. Pigeon, Royal Oak, and Joseph D. Upchurch, Warren, Mich., assignors to General Motors Corporation, Detroit, Mich., a corporation of Delaware
Filed Oct. 13, 1965, Ser. No. 495,385
4 Claims. (Cl. 297—372)

This invention relates to an adjustable seat back mechanism and more particularly to a seat back adjusting mechanism for controlling the pivotal movement of a seat back to various reclining positions from its normal upright seat forming position and also allowing normal forward pivotal movement of the seat back over the seat cushion.

The trend in vehicle seating structures is to provide individual bucket seats for the front seated passenger and driver of motor vehicles and in some instances the rear seats have also been provided with individual bucket seats. In two door vehicles, it is common practice to have the seat back of the front seat pivot forwardly over the seat cushion for increasing the ease of entrance to the rear seating compartment. To increase the comfort of the front seats, various structures have been developed to allow the seat back to be pivoted rearwardly from its seat forming position to various reclining positions.

It is an object of this invention to provide a hinged seat back mechanism for controlling the movement of the seat back to various positions of reclining adjustment and also permitting a forward pivotal movement of the seat back over the seat cushion.

Another object of this invention is to provide a control mechanism that may be manually operated by a single lever to adjust the seat back in its various positions of adjustment.

A further object of this invention is to provide a control mechanism having a spring detent means for cooperating with a cam used to position the seat back in reclining positions of adjustment.

Another more specific object of this invention is to provide a control mechanism employing a cam pivotally secured to the seat frame for cooperating with a pin secured to the seat back whereby the seat may be moved to and held in various positions of reclining adjustment and also permitting the seat to be pivoted forwardly over the seat cushion for easy entrance to the rear of the motor vehicle when the seat is in its upright seat forming position.

These and other objects and advantages of this invention will become more apparent as reference is had to the following specification and drawings wherein.

Figure 1:
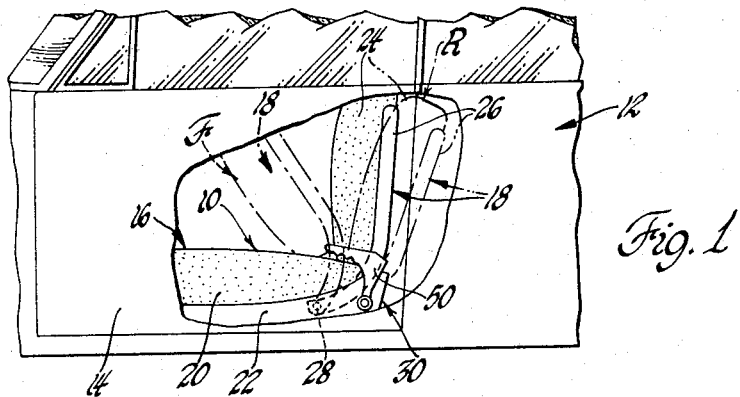
FIGURE 1 is a side view of a portion of a vehicle body, with sections cut away, showing, in solid lines, the front seating structure in the seat forming position and, in phantom lines, the seating structure in various positions of adjustment.

Referring now to the drawings, as best seen in FIGURE 1 a vehicle seating structure 10 is mounted in a conventional two door vehicle body 12 adjacent one of the doors 14. The seating structure 10 includes a seat portion 16 and a seat back portion 18. The seat portion 16 includes a seat cushion 20 mounted on a seat frame 22 that is secured to the vehicle body 12. The seat back portion 18 includes a seat back cushion 24 mounted on a seat back frame 26. The seat back frame 26 is pivotally secured to the seat frame 22 by a pivot connection 28 such as a rivet or other suitable means. The structure described so far is conventional seating structure whereby the seat back 18 may be pivoted forwardly over the seat cushion, as seen at position F in phantom lines in FIGURES 1 and 2.

Figure 2:
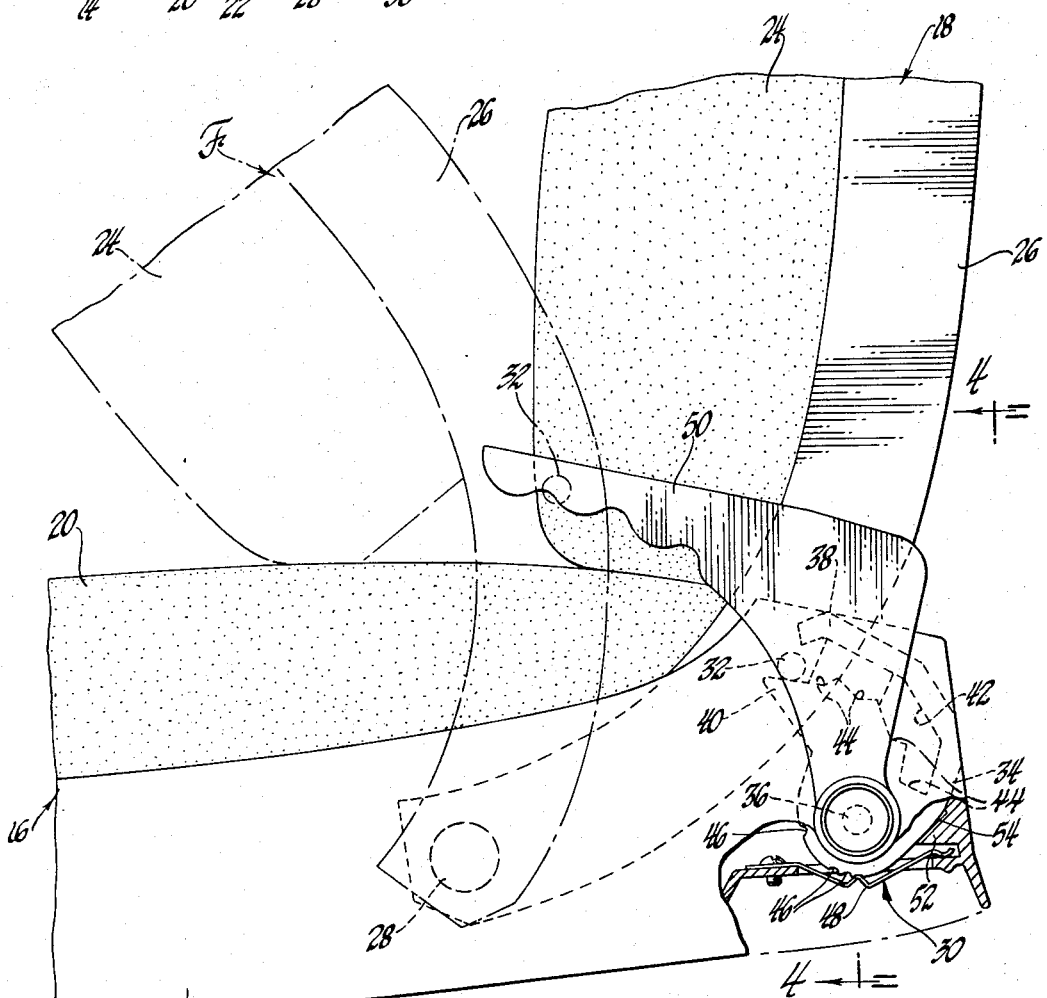
FIGURE 2 is an enlarged view of the seat back adjusting mechanism shown in FIGURE 1, with sections cut away, with the seat back in its seat forming position and showing, in phantom lines, the seat back in its forward folded position.
Figure 3:
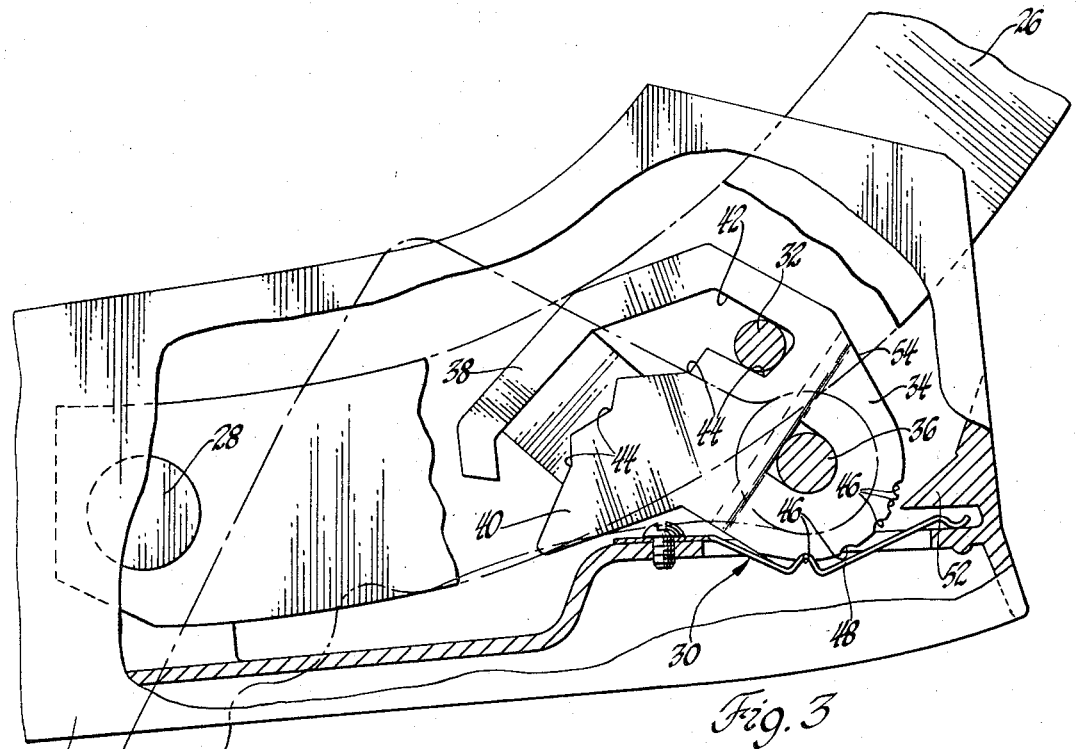
FIGURE 3 is an enlarged view of a portion of FIGURE 2, with sections cut away, showing the seat back control mechanism position when the seat back is in its most reclined position.
Figure 4:
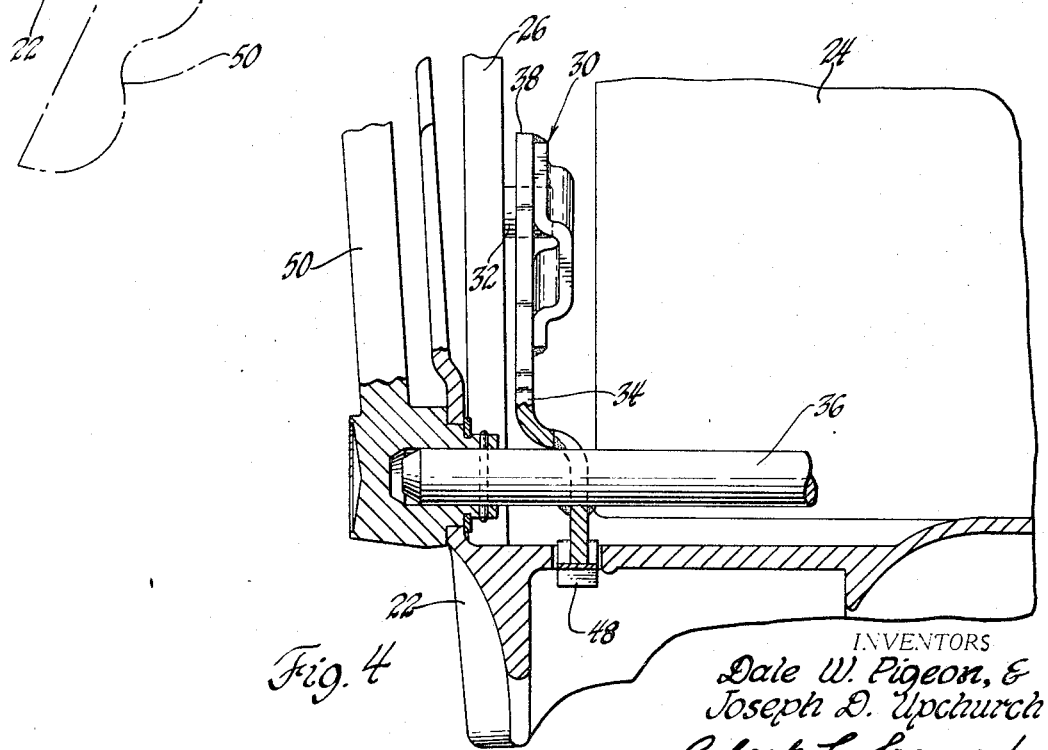
FIGURE 4 is a view substantially along the line 4—4 in the direction of the arrows of FIGURE 2, with portions cut away, to show the manner in which the control handle is connected to and operates the cam of the control mechanism.

To move the seat back 18 from the upright seat forming position, shown in solid lines in FIGURES 1 and 2, to the reclining position R, as seen in phantom lines in FIGURE 1, the seat back adjusting mechanism of this invention is utilized. The seat back adjusting mechanism indicated generally by the numeral 30 is best seen in FIGURES 2 through 4.

Identical right and left adjusting mechanisms may be used on each side of the seat if desired, but for ease of explanation only one unit on the left side of the seating structure will be illustrated and explained.

The seat back adjusting mechanism 30 includes a pin 32 secured to the inside of the seat back frame 26. A slotted cam member 34 is secured to a shaft 36 journaled for rotation in the seat frame 22. If desired, the shaft 36 may extend from one side of the seat to the other for supporting and controlling a cam 34 at each side of the seat. The cam 34 includes a pair of arms 38 and 40 defining a slot 42 in which the pin 32 moves. The inner surface of arm 38, forming one surface of the slot 42, is generally smooth while the inner surface of arm 40, forming the other surface of the slot 42, has a plurality of notches 44 for the purpose to be explained later. The outer surface of cam member 34 opposite from the slotted area includes a plurality of keeper notches 46 which cooperate with the intermediate portion of a generally W shaped leaf spring 48 for holding the cam member 34 in the desired position of adjustment. A handle 50 is secured to shaft 36 for rotating the shaft and cam secured thereto.

An arm 52 of the seat frame 22 projects into the path of the rotary movement of the cam member 34 for contacting a portion 54 of the outer surface of the cam member 34 to limit clockwise rotation of the cam, as best seen in FIGURE 2. Rotation of cam 34 in the counter-clockwise direction is limited by pin 32 bottoming in slot 42, as best seen in FIGURE 3.

To operate the seat back adjusting mechanism, starting from the seat forming position, as shown in solid lines in FIGURES 1 and 2, the handle 50 is manually rotated counterclockwise to cause the seat back 18 to be adjusted to a reclining position. Such movement of the handle 50 rotates shaft 36 and the cam member 34 secured thereto. As the cam 34 is rotated, the pin 32 is moved within the slot 42 causing the seat back 18 to be pivoted clockwise about pivot point 28 to a reclining position. Each of the notches 44 positions the seat back at a different reclining position, thus providing a plurality of positions for seat occupants to select the most comfortable as provided by the individual notches. One of the keeper notches 46 is positioned to cooperate with the leaf spring 48 when pin 32 is in one of the notches 44 for holding the cam in the desired position of adjustment.

The light detenting action of spring 48 is sufficient to maintain the cam in the selected reclining position of adjustment since the weight of the seat back 18 reacting about pivot point 28 through pin 32 has a force component that passes through the center of rotation of shaft 36.

Movement of the seat back to the various reclining positions may be accomplished by moving the handle 50 without the inconvenient grasping of the seat back to assist movement because of the mechanical advantage provided by the handle lever arm and the cam ramps between the notches 44. To return the seat back 18 from a reclined position, the handle 50 is manually rotated clockwise about the center of rotation of shaft 36 until surface 54 of cam 34 contacts stop 52. When the cam surface 54 contacts stop 52, the seat back 18 is in seat forming position and the pin 32 is at the open end of slot 42, as seen in dotted lines of FIGURE 2. In the seat forming position, the seat back may be pivoted forward counterclockwise about pivot 28 to the F position as a conventional seat back. The arm 38 of cam 34 prevents such forward pivotal movement when the seat back is in any reclined position.

Should it be desirable to have a seat back that could be pivoted forwardly from a reclined position without first returning to the seat forming position, the arm 38 could be removed from the cam 34 to provide this type of mechanism. In such a mechanism, the seat back could be rotated manually forward to position F for easy entrance to the rear seating compartment and then returned to the preselected reclined position.

While the preferred embodiment of this invention has been illustrated and described herein, it is obvious that many structural details may be changed without departing from the spirit and scope of the following claims.

We claim:

1. A seating unit having a seat and a seat back, a pivotal connection between said seat and said seat back for pivotally supporting said seat back during forwardly and rearwardly pivotal movement relative to said seat, said seat back having a seat forming position, a folded position pivoted forwardly about said pivotal connection from said seat forming position and above said seat, and a plurality of reclining positions pivoted rearwardly from said seat forming position to a final reclining position and being movable therebetween, adjusting mechanism operably connected to said seating unit for supporting and controlling movement of said seat back between said seat forming position and said reclining positions and for supporting said seat back in said seat forming position, and means for actuating said adjusting mechanism, said adjusting mechanism includes a manually rotatable cam rotatably mounted on said seat and a pin secured to said seat back, said pin bearing on said cam for supporting said seat back in said seat forming position and said reclining positions, and said pin cooperating with said cam for adjusting said seat back between said positions upon rotation of said cam.

2. The device as claimed in claim 1 including stop means for limiting rotation of said cam in one direction when said seat back is in said seat forming position and in the other direction when said seat back is in the final reclining position.

3. The device as claimed in claim 1 including a shaft, a handle secured to said shaft, said cam secured on said shaft for rotation therewith, said shaft and said handle being rotatably supported on said seat, stop means cooperating with said cam for limiting rotation of said cam, a plurality of notches formed on said cam for providing indexing steps for said pin to rest at intervals of rotation of said cam whereby each notch defines a different reclining position of said seat back.

4. In combination in a vehicle body, a seating unit having a seat and a seat back, said seat secured to said body in a forward facing position, a pivotal connection between the rear of said seat and the bottom of said seat back for pivotally supporting said seat back during movement forwardly and rearwardly relative to said seat, said seat back having a seat forming position, a folded position pivoted forwardly above said seat and a plurality of reclining positions pivoted rearwardly of said seat forming position to a final reclining position and being movable therebetween, adjusting mechanism operably connected to said seating unit for controlling movement of said seat back between said seat forming position and said reclining positions and for supporting said seat back in said seat forming position and said reclining positions, said adjusting mechanism including a pin secured to said seat back, a cam rotatably secured to said seat for cooperating with said pin for supporting said seat back in said seat forming position and said reclining positions and for moving said seat back to said reclining positions, stop means on said seat for limiting rotation of said cam in one direction of said seat forming position, said pin contacting a portion of said cam for limiting rotation of said cam in the other direction of said final reclining position, keeper notches formed on the outer periphery of said cam, spring detent means for cooperating with said keeper notches for holding said cam in selected position, and a control handle operably connected to said cam for manually moving said cam whereby said seat back may be moved to a desired reclining position by the movement of the cam.

References Cited
UNITED STATES PATENTS

| | | | |
|---|---|---|---|
| 2,809,691 | 10/1957 | Norwood et al. | 297—369 |
| 2,959,206 | 11/1960 | Tedesco | 297—369 |
| 3,008,765 | 11/1961 | Tischler et al. | 297—367 |
| 3,079,199 | 2/1963 | Tischler | 297—367 |
| 3,189,383 | 6/1965 | Gniech | 297—365 |

DAVID J. WILLIAMOWSKY, *Primary Examiner.*

BOBBY R. GAY, *Examiner.*

G. O. FINCH, *Assistant Examiner.*